United States Patent
Li et al.

(10) Patent No.: US 10,306,602 B2
(45) Date of Patent: May 28, 2019

(54) DATA TRANSMISSION METHOD AND APPARATUS

(71) Applicant: HUAWEI TECHNOLOGIES CO., LTD., Shenzhen (CN)

(72) Inventors: Yunbo Li, Shenzhen (CN); Jun Luo, Shanghai (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 342 days.

(21) Appl. No.: 15/215,108

(22) Filed: Jul. 20, 2016

(65) Prior Publication Data
US 2016/0330726 A1    Nov. 10, 2016

Related U.S. Application Data

(63) Continuation of application No. PCT/CN2014/070995, filed on Jan. 21, 2014.

(51) Int. Cl.
*H04W 72/04*    (2009.01)
*H04L 5/14*    (2006.01)
(Continued)

(52) U.S. Cl.
CPC ....... *H04W 72/0406* (2013.01); *H04L 1/1685* (2013.01); *H04L 1/1854* (2013.01);
(Continued)

(58) Field of Classification Search
None
See application file for complete search history.

(56) References Cited

U.S. PATENT DOCUMENTS

2007/0217352 A1    9/2007    Kwon
2008/0280621 A1    11/2008   Soomro et al.
(Continued)

FOREIGN PATENT DOCUMENTS

CN    1644018 A     7/2005
CN    101356772 A   1/2009
(Continued)

OTHER PUBLICATIONS

International Search Report and Written Opinion dated Oct. 28, 2014 in corresponding International Patent Application No. PCT/CN2014/070995.
(Continued)

*Primary Examiner* — Kenny S Lin
(74) *Attorney, Agent, or Firm* — Staas & Halsey LLP

(57) ABSTRACT

Embodiments of the present invention provide a data transmission method and apparatus. The data transmission method includes: receiving, by a third site, a first transmit frame transmitted by a first site to a second site, and acquiring a transmission end moment of the first transmit frame; transmitting, by the third site, a second transmit frame to a fourth site, and instructing the fourth site to delay returning a response frame; and receiving, by the third site after at least one preset time length after transmission of the second transmit frame ends, the response frame transmitted by the fourth site; where a transmission end moment of the second transmit frame is not later than the transmission end moment of the first transmit frame. The embodiments of the present invention implement that the third site can also transmit data when the first site transmits data, which improves system transmission efficiency.

16 Claims, 6 Drawing Sheets

(51) Int. Cl.
*H04L 1/16* (2006.01)
*H04L 1/18* (2006.01)
*H04W 84/12* (2009.01)

(52) U.S. Cl.
CPC .............. *H04L 1/1887* (2013.01); *H04L 5/14* (2013.01); *H04W 72/0446* (2013.01); *H04W 84/12* (2013.01)

(56) References Cited

U.S. PATENT DOCUMENTS

| | | | |
|---|---|---|---|
| 2010/0232324 A1 | 9/2010 | Radunovic et al. | |
| 2011/0038332 A1 | 2/2011 | Liu et al. | |
| 2013/0010769 A1 | 1/2013 | Kang et al. | |
| 2013/0294270 A1* | 11/2013 | Yang | H04W 48/16 370/252 |
| 2016/0192397 A1 | 6/2016 | Kim et al. | |

FOREIGN PATENT DOCUMENTS

| | | | |
|---|---|---|---|
| CN | 102356593 A | | 2/2012 |
| CN | 102571675 A | * | 7/2012 |
| CN | 102571675 A | | 7/2012 |
| CN | 102571675 B | * | 1/2015 |
| WO | 2006/133414 A2 | | 12/2006 |
| WO | 2015/023143 A1 | | 2/2015 |

OTHER PUBLICATIONS

Extended European Search Report dated Dec. 9, 2016 in corresponding European Patent Application No. 14879849.9.
Shukla et al., "Mitigating the Exposed Node Problem in IEEE 802.11 Ad Hoc Networks", IEEE, 2003, pp. 157-162.
Shigeyasu et al., "A Method for Synchronous Transmissions with Exposing Terminal on the Basis of Overhearing RTS Header Information", 2009 International Conference of Network-Based Information Systems, IEEE Computer Society, 2009, pp. 559-563.
Mittal et al., "RTSS/CTSS: Mitigation of Exposed Terminals in Static 802.11-Based Mesh Networks", pp. 1-10.
Deng et al., "The Head-of-line Blocking Problem on Exposed Terminals in MANETs", IEEE, 2006, pp. 1-5.
Park et al, "Enhancement on resource utilization in OBSS environment", IEEE 802.11-13/1056br1, Sep. 16, 2013, pp. 1-12.

* cited by examiner

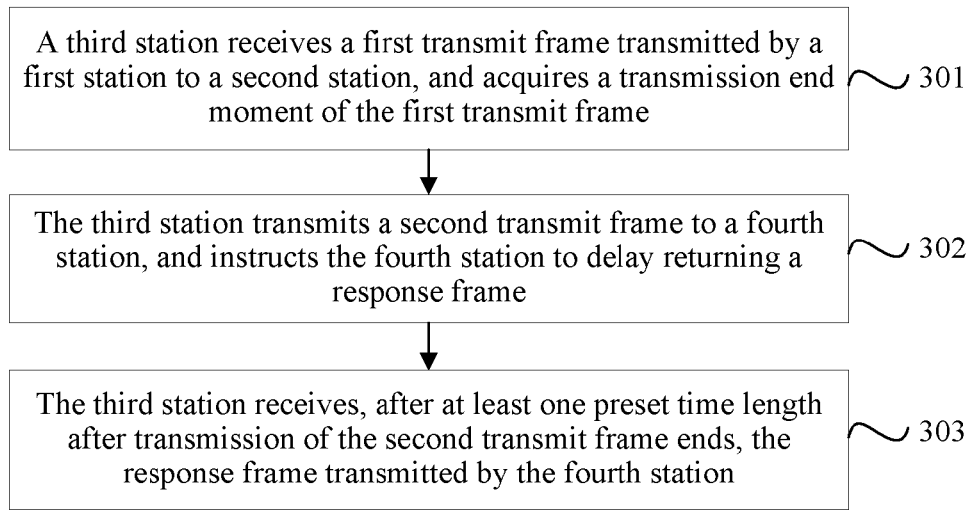
FIG. 3
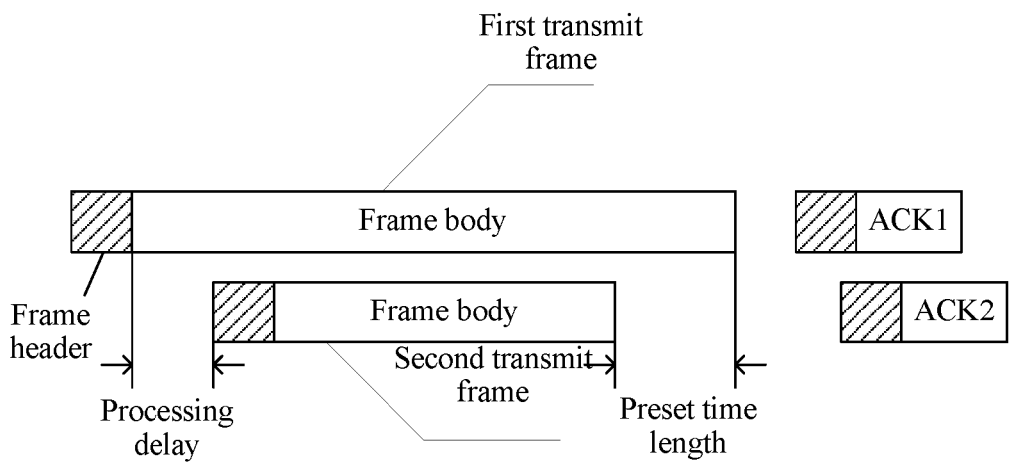
FIG. 4
| Frame control | Duration/ identifier | Address 1 | Address 2 | ... | Frame body | Frame detection sequence |
FIG. 5

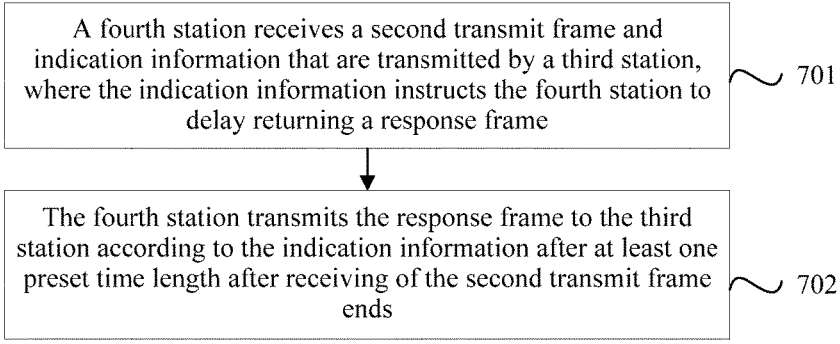
FIG. 6
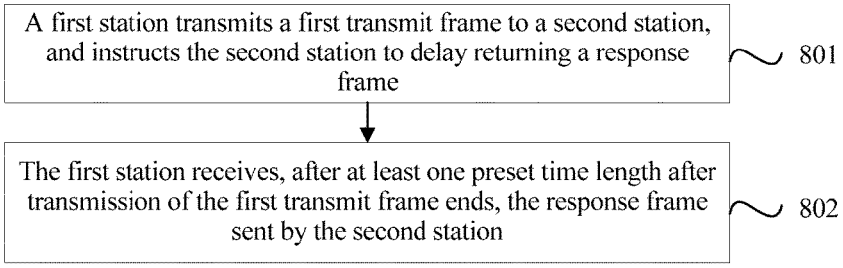
FIG. 7
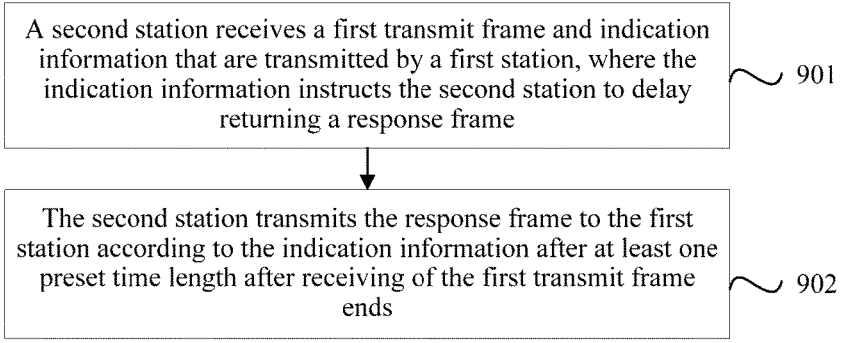
FIG. 8
FIG. 9

DATA TRANSMISSION METHOD AND APPARATUS

CROSS-REFERENCE TO RELATED APPLICATIONS

This application is a continuation of International Patent Application No. PCT/CN2014/070995, filed on Jan. 21, 2014, which is hereby incorporated by reference in its entirety.

TECHNICAL FIELD

Embodiments of the present invention relate to the field of communications technologies, and in particular, to a data transmission method and apparatus.

BACKGROUND

In a wireless local area network (Wireless Local Area Networks, WLAN for short) system, carrier sense and a channel reservation mechanism are used. When a channel is occupied by a site in a period of time, another site is not allowed to transmit data within this period of the time. FIG. 1 is a schematic diagram 1 of site communication. As shown in FIG. 1, a site C and a site B are within a coverage area of a site A. When the site A transmits data to the site B, the site C also receives a transmit signal of the site A. To avoid a conflict, the site C does not transmit data. Therefore, in the prior art, transmission efficiency of the system is not high.

SUMMARY

Embodiments of the present invention provide a data transmission method and apparatus, so as to improve system efficiency.

According to a first aspect, an embodiment of the present invention provides a data transmission method, including:

receiving, by a third site, a first transmit frame transmitted by a first site to a second site, and acquiring a transmission end moment of the first transmit frame;

transmitting, by the third site, a second transmit frame to a fourth site, and instructing the fourth site to delay returning a response frame; and receiving, by the third site after at least one preset time length after transmission of the second transmit frame ends, the response frame transmitted by the fourth site;

where the third site is within a coverage area of the first site, and the second site is outside a coverage area of the third site; a transmission end moment of the second transmit frame is not later than the transmission end moment of the first transmit frame, and the preset time length is greater than or equal to a difference between the transmission end moment of the first transmit frame and the transmission end moment of the second transmit frame.

With reference to the first aspect, in a first possible implementation manner of the first aspect, the acquiring, by a third site, a transmission end moment of the first transmit frame includes:

obtaining, by the third site, the transmission end moment of the first transmit frame by parsing frame header information of the first transmit frame.

With reference to the first aspect or the first possible implementation manner of the first aspect, in a second possible implementation manner of the first aspect, the transmitting, by the third site, a second transmit frame to a fourth site, and instructing the fourth site to delay returning a response frame includes:

transmitting, by the third site, the second transmit frame to the fourth site, where the second transmit frame includes the preset time length, so that the fourth site returns the response frame after at least the preset time length after receiving of the second transmit frame ends;

or transmitting, by the third site, the second transmit frame to the fourth site, and transmitting, to the fourth site, notification signaling including the preset time length, so that the fourth site returns the response frame after at least the preset time length after receiving of the second transmit frame ends;

or transmitting, by the third site, the second transmit frame to the fourth site, where the second transmit frame includes information used to instruct the fourth site temporarily not to return the response frame after the second transmit frame is received; and transmitting, by the third site, a response request frame to the fourth site after at least the preset time length after the transmission of the second transmit frame ends, where the response request frame is used to instruct the fourth site to return the response frame.

With reference to the first aspect or either of the first and the second possible implementation manners of the first aspect, in a third possible implementation manner of the first aspect, before the transmitting, by the third site, a second transmit frame to a fourth site, the method further includes:

determining, by the third site, that the first site is a transmission opportunity holding node of the third site.

With reference to the first aspect or any one of the first to the third possible implementation manners of the first aspect, in a fourth possible implementation manner of the first aspect, before the receiving, by a third site, a first transmit frame transmitted by a first site to a second site, the method further includes:

establishing, by the third site, a list of neighbor sites.

With reference to the first aspect or any one of the first to the fourth possible implementation manners of the first aspect, in a fifth possible implementation manner of the first aspect, before the acquiring, by a third site, a transmission end moment of the first transmit frame, the method further includes:

parsing, by the third site, the frame header information of the first transmit frame, and acquiring identification information of a receiving site that receives the first transmit frame; and determining, by the third site, whether the identification information of the receiving site is in the list of neighbor sites of the third site, and if the identification information of the receiving site is not in the list of neighbor sites of the third site, executing the operation of acquiring a transmission end moment of the first transmit frame.

According to a second aspect, an embodiment of the present invention provides a data transmission method, including:

receiving, by a fourth site, a second transmit frame and indication information that are transmitted by a third site, where the indication information instructs the fourth site to delay returning a response frame, and a transmission end moment of the second transmit frame is not later than a transmission end moment of a first transmit frame transmitted by a first site to a second site; and transmitting, by the fourth site, the response frame to the third site according to the indication information after at least one preset time length after receiving of the second transmit frame ends;

where the third site is within a coverage area of the first site, and the second site is outside a coverage area of the third site; the preset time length is greater than or equal to a difference between the transmission end moment of the first transmit frame and the transmission end moment of the second transmit frame.

With reference to the second aspect, in a first possible implementation manner of the second aspect, the receiving, by a fourth site, a second transmit frame and indication information that are transmitted by a third site, where the indication information instructs the fourth site to delay returning a response frame includes:

receiving, by the fourth site, the second transmit frame transmitted by the third site, where the second transmit frame includes the preset time length; and correspondingly, the transmitting, by the fourth site, the response frame to the third site according to the indication information after at least one preset time length after receiving of the second transmit frame ends includes:

transmitting, by the fourth site, the response frame to the third site according to the second transmit frame after at least the preset time length after receiving of the second transmit frame ends;

or the receiving, by a fourth site, a second transmit frame and indication information that are transmitted by a third site, where the indication information instructs the fourth site to delay returning a response frame includes:

receiving, by the fourth site, the second transmit frame and notification signaling that are transmitted by the third site, where the notification signaling includes the preset time length; and correspondingly, the transmitting, by the fourth site, the response frame to the third site according to the indication information after at least one preset time length after receiving of the second transmit frame ends includes:

transmitting, by the fourth site, the response frame to the third site according to the notification signaling after at least the preset time length after receiving of the second transmit frame ends;

or the receiving, by a fourth site, a second transmit frame and indication information that are transmitted by a third site, where the indication information instructs the fourth site to delay returning a response frame includes:

receiving, by the fourth site, the second transmit frame transmitted by the third site, where the second transmit frame includes information used to instruct the fourth site temporarily not to return the response frame after the second transmit frame is received; and receiving, by the fourth site, a response request frame transmitted by the third site after at least the preset time length after transmission of the second transmit frame ends, where the response request frame is used to instruct the fourth site to return the response frame; and correspondingly, the transmitting, by the fourth site, the response frame to the third site according to the indication information after at least one preset time length after receiving of the second transmit frame ends includes:

transmitting, by the fourth site, the response frame to the third site according to the response request frame.

According to a third aspect, an embodiment of the present invention provides a data transmission method, including:

transmitting, by a first site, a first transmit frame to a second site, and instructing the second site to delay returning a response frame; and receiving, by the first site after at least one preset time length after transmission of the first transmit frame ends, the response frame transmitted by the second site.

With reference to the third aspect, in a first possible implementation manner of the third aspect, the transmitting, by a first site, a first transmit frame to a second site, and instructing the second site to delay returning a response frame includes:

transmitting, by the first site, the first transmit frame to the second site, where the first transmit frame includes the preset time length, so that the second site returns the response frame after at least the preset time length after receiving of the first transmit frame ends;

or transmitting, by the first site, the first transmit frame to the second site, and transmitting, to the second site, notification signaling including the preset time length, so that the second site returns the response frame after at least the preset time length after receiving of the first transmit frame ends;

or transmitting, by the first site, the first transmit frame to the second site, where the first transmit frame includes information used to instruct the second site temporarily not to return the response frame after the first transmit frame is received;

and transmitting, by the first site, a response request frame to the second site after at least the preset time length after the transmission of the first transmit frame ends, where the response request frame is used to instruct the second site to return the response frame.

According to a fourth aspect, an embodiment of the present invention provides a data transmission method, including:

receiving, by a second site, a first transmit frame and indication information that are transmitted by a first site, where the indication information instructs the second site to delay returning a response frame; and transmitting, by the second site, the response frame to the first site according to the indication information after at least one preset time length after receiving of the first transmit frame ends.

With reference to the fourth aspect, in a first possible implementation manner of the fourth aspect, the receiving, by a second site, a first transmit frame and indication information that are transmitted by a first site, where the indication information instructs the second site to delay returning a response frame includes:

receiving, by the second site, the first transmit frame transmitted by the first site, where the first transmit frame includes the preset time length; and correspondingly, the transmitting, by the second site, the response frame to the first site according to the indication information after at least one preset time length after receiving of the first transmit frame ends includes:

transmitting, by the second site, the response frame to the first site according to the first transmit frame after at least the preset time length after receiving of the first transmit frame ends;

or the receiving, by a second site, a first transmit frame and indication information that are transmitted by a first site, where the indication information instructs the second site to delay returning a response frame includes:

receiving, by the second site, the first transmit frame and notification signaling that are transmitted by the first site, where the notification signaling includes the preset time length; and correspondingly, the transmitting, by the second site, the response frame to the first site according to the indication information after at least one preset time length after receiving of the first transmit frame ends includes:

transmitting, by the second site, the response frame to the first site according to the notification signaling after at least the preset time length after receiving of the first transmit frame ends;

or the receiving, by a second site, a first transmit frame and indication information that are transmitted by a first site, where the indication information instructs the second site to delay returning a response frame includes:

receiving, by the second site, the first transmit frame transmitted by the first site, where the first transmit frame includes information used to instruct the second site temporarily not to return the response frame after the first transmit frame is received; and receiving, by the second site, a response request frame, where the response request frame is transmitted by the first site after at least the preset time length after transmission of the first transmit frame ends, and the response request frame is used to instruct the second site to return the response frame; and correspondingly, the transmitting, by the second site, the response frame to the first site according to the indication information after at least one preset time length after receiving of the first transmit frame ends includes:

transmitting, by the second site, the response frame to the first site according to the response request frame.

According to a fifth aspect, an embodiment of the present invention provides a site, where the site is a third site and the site includes:

an acquiring module, configured to: receive a first transmit frame transmitted by a first site to a second site, and acquire a transmission end moment of the first transmit frame;

an indication module, configured to: transmit a second transmit frame to a fourth site, and instruct the fourth site to delay returning a response frame; and a receiving module, configured to receive, after at least one preset time length after transmission of the second transmit frame ends, the response frame transmitted by the fourth site;

where the third site is within a coverage area of the first site, and the second site is outside a coverage area of the third site; a transmission end moment of the second transmit frame is not later than the transmission end moment of the first transmit frame, and the preset time length is greater than or equal to a difference between the transmission end moment of the first transmit frame and the transmission end moment of the second transmit frame.

With reference to the fifth aspect, in a first possible implementation manner of the fifth aspect, the acquiring module is specifically configured to obtain the transmission end moment of the first transmit frame by parsing frame header information of the first transmit frame.

With reference to the fifth aspect or the first possible implementation manner of the fifth aspect, in a second possible implementation manner of the fifth aspect, the indication module is specifically configured to: transmit the second transmit frame to the fourth site, where the second transmit frame includes the preset time length, so that the fourth site returns the response frame after at least the preset time length after receiving of the second transmit frame ends;

or transmit the second transmit frame to the fourth site, and transmit, to the fourth site, notification signaling including the preset time length, so that the fourth site returns the response frame after at least the preset time length after receiving of the second transmit frame ends;

or transmit the second transmit frame to the fourth site, where the second transmit frame includes information used to instruct the fourth site temporarily not to return the response frame after the second transmit frame is received; and transmit a response request frame to the fourth site after at least the preset time length after the transmission of the second transmit frame ends, where the response request frame is used to instruct the fourth site to return the response frame.

With reference to the fifth aspect or either of the first and the second possible implementation manner of the fifth aspect, in a third possible implementation manner of the fifth aspect, the site further includes:

a first determining module, configured to determine that the first site is a transmission opportunity holding node of the third site.

With reference to the fifth aspect or any one of the first to the third possible implementation manners of the fifth aspect, in a fourth possible implementation manner of the fifth aspect, the site further includes:

an establishing module, configured to establish a list of neighbor sites.

With reference to the fifth aspect or any one of the first to the fourth possible implementation manners of the fifth aspect, in a fifth possible implementation manner of the fifth aspect, the site further includes:

a parsing module, configured to: parse the frame header information of the first transmit frame, and acquire identification information of a receiving site that receives the first transmit frame; and a second determining module, configured to determine whether the identification information of the receiving site is in the list of neighbor sites of the third site; and if the identification information of the receiving site is not in the list of neighbor sites of the third site, the acquiring module is configured to execute the operation of acquiring a transmission end moment of the first transmit frame.

According to a sixth aspect, an embodiment of the present invention provides a site, where the site is a fourth site and the site includes:

a receiving module, configured to receive a second transmit frame and indication information that are transmitted by a third site, where the indication information instructs the fourth site to delay returning a response frame, and a transmission end moment of the second transmit frame is not later than a transmission end moment of a first transmit frame transmitted by a first site to a second site; and a transmitting module, configured to transmit the response frame to the third site according to the indication information after at least one preset time length after receiving of the second transmit frame ends;

where the third site is within a coverage area of the first site, and the second site is outside a coverage area of the third site; the preset time length is greater than or equal to a difference between the transmission end moment of the first transmit frame and the transmission end moment of the second transmit frame.

With reference to the sixth aspect, in a first possible implementation manner of the sixth aspect, the receiving module is specifically configured to receive the second transmit frame transmitted by the third site, where the second transmit frame includes the preset time length; and correspondingly, the transmitting module is specifically configured to transmit the response frame to the third site according to the second transmit frame after at least the preset time length after receiving of the second transmit frame ends;

or the receiving module is further specifically configured to receive the second transmit frame and notification signaling that are transmitted by the third site, where the notification signaling includes the preset time length; and correspondingly, the transmitting module is further specifically configured to transmit the response frame to the third site according to the notification signaling after at least the preset time length after receiving of the second transmit frame ends;

or the receiving module is further specifically configured to: receive the second transmit frame transmitted by the third site, where the second transmit frame includes information used to instruct the fourth site temporarily not to return the response frame after the second transmit frame is received, and receive a response request frame transmitted by the third site after at least the preset time length after transmission of the second transmit frame ends, where the response request frame is used to instruct the fourth site to return the response frame; and correspondingly, the transmitting module is further specifically configured to transmit the response frame to the third site according to the response request frame.

According to a seventh aspect, an embodiment of the present invention provides a site, where the site is a first site and the site includes:

an indication module, configured to: transmit a first transmit frame to a second site, and instruct the second site to delay returning a response frame; and a receiving module, configured to receive, after at least one preset time length after transmission of the first transmit frame ends, the response frame transmitted by the second site.

With reference to the seventh aspect, in a first possible implementation manner of the seventh aspect, the indication module is specifically configured to:

transmit the first transmit frame to the second site, where the first transmit frame includes the preset time length, so that the second site returns the response frame after at least the preset time length after receiving of the first transmit frame ends;

or transmit the first transmit frame to the second site, and transmit, to the second site, notification signaling including the preset time length, so that the second site returns the response frame after at least the preset time length after receiving of the first transmit frame ends;

or transmit the first transmit frame to the second site, where the first transmit frame includes information used to instruct the second site temporarily not to return the response frame after the first transmit frame is received; and transmit a response request frame to the second site after at least the preset time length after the transmission of the first transmit frame ends, where the response request frame is used to instruct the second site to return the response frame.

According to an eighth aspect, an embodiment of the present invention provides a site, where the site is a second site and the site includes:

a receiving module, configured to receive a first transmit frame and indication information that are transmitted by a first site, where the indication information instructs the second site to delay returning a response frame; and a transmitting module, configured to transmit the response frame to the first site according to the indication information after at least one preset time length after receiving of the first transmit frame.

With reference to the eighth aspect, in a first possible implementation manner of the eighth aspect, the receiving module is specifically configured to receive the first transmit frame transmitted by the first site, where the first transmit frame includes the preset time length; and correspondingly, the transmitting module is specifically configured to transmit the response frame to the first site according to the first transmit frame after at least the preset time length after receiving of the first transmit frame ends;

or the receiving module is further specifically configured to receive the first transmit frame and notification signaling that are transmitted by the first site, where the notification signaling includes the preset time length; and correspondingly, the transmitting module is further specifically configured to transmit the response frame to the first site according to the notification signaling after at least the preset time length after receiving of the first transmit frame ends; or the receiving module is further specifically configured to: receive the first transmit frame transmitted by the first site, where the first transmit frame includes information used to instruct the second site temporarily not to return the response frame after the first transmit frame is received;

receive a response request frame, where the response request frame is transmitted by the first site after at least the preset time length after transmission of the first transmit frame ends, and the response request frame is used to instruct the second site to return the response frame; and correspondingly, the transmitting module is further specifically configured to transmit the response frame to the first site according to the response request frame.

In the present invention, a third site transmits a second transmit frame to a fourth site by acquiring a transmission end moment of a first transmit frame that is currently transmitted by a first site to a second site, instructs the fourth site to delay returning a response frame, and receives the response frame transmitted by the fourth site after at least one preset time length after transmission of the second transmit frame ends. A transmission end moment of the second transmit frame is not later than the transmission end moment of the first transmit frame, and the preset time length is greater than or equal to a difference between the transmission end moment of the first transmit frame and the transmission end moment of the second transmit frame, so that the fourth site returns the response frame after waiting for at least the preset time length upon receiving the second transmit frame. In this way, the third site can also transmit data when the first site transmits data, which improves system transmission efficiency.

BRIEF DESCRIPTION OF DRAWINGS

To describe the technical solutions in the embodiments of the present invention or in the prior art more clearly, the following briefly introduces the accompanying drawings required for describing the embodiments or the prior art.

Apparently, the accompanying drawings in the following description show some embodiments of the present invention, and persons of ordinary skill in the art may still derive other drawings from these accompanying drawings without creative efforts.

FIG. 3 is a flowchart of Embodiment 1 of a data transmission method according to the present invention;

FIG. 4 is a schematic diagram of a data transmission method 1 according to the present invention;

FIG. 5 is a schematic diagram 1 of a frame format of a data frame;

FIG. 6 is a schematic diagram 2 of a frame format of a data frame;

FIG. 7 is a flowchart of Embodiment 2 of a data transmission method according to the present invention;

FIG. 8 is a flowchart of Embodiment 3 of a data transmission method according to the present invention;

FIG. 9 is a flowchart of Embodiment 4 of a data transmission method according to the present invention;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
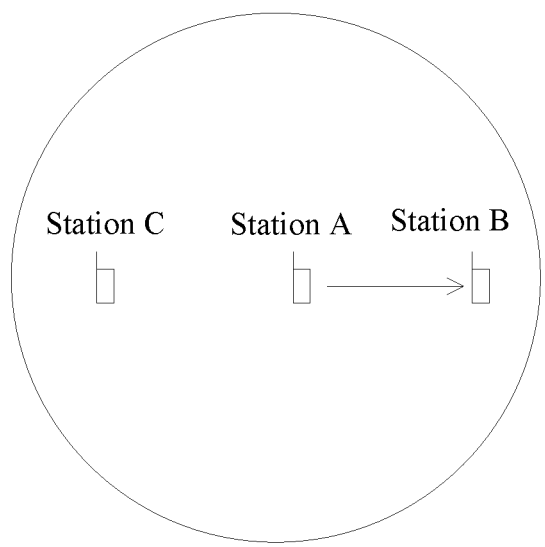
FIG. 1 is a schematic diagram 1 of site communication.
Figure 2:
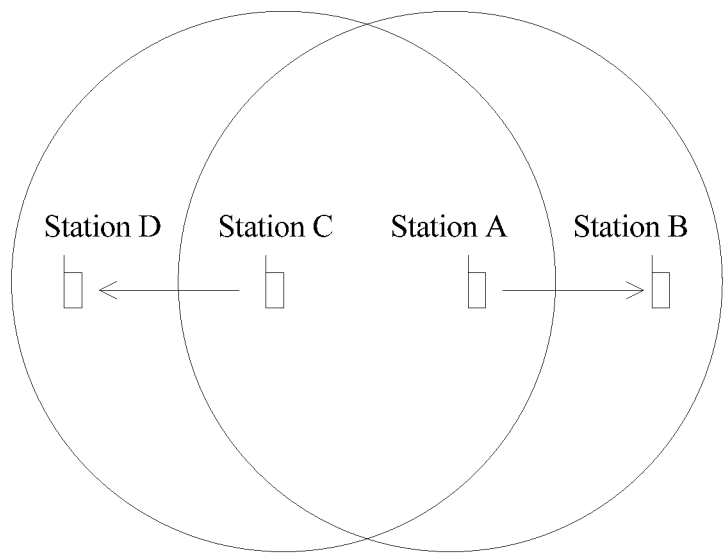
FIG. 2 is a schematic diagram 2 of site communication.

In an existing WLAN system, when a channel is occupied in a period of time, another site is not allowed to transmit data within this period of time. FIG. 2 is a schematic diagram 2 of site communication. As shown in FIG. 2, wireless signal coverage areas of a site C and a site A are respectively areas circled by the first circle from the left and the second circle from the left in FIG. 2, that is, a site B is not within a coverage area of the site C, and a site D is not within a coverage area of the site A. When the site A transmits data to the site B, and the site C also intends to transmit data to the site D, because the site C within the coverage area of the site A receives a transmit signal of the site A, the site C does not transmit data to the site D to avoid a conflict. However, because the site B is not within the coverage area of the site C, data transmission by the site C to the site D actually does not affect data transmission by the site A to the site B, that is, the site C is an exposed site to a link from the site A to the site B (it should be emphasized that, because an exposed site is related to directionality of a link, the link from the site A to the site B particularly refers to a one-way link on which the site A performs transmission and the site B performs receiving, and a reverse link refers to as a link from the site B to the site A) A data frame transmitted by the site A to the site B may correspond to a first transmit frame in this embodiment of the present invention, a data frame transmitted by the site C to the site D may correspond to a second transmit frame in this embodiment of the present invention, a communication link between the site A and the site B is a primary communication link, and a communication link between the site C and the site D is a secondary communication link. Both the first transmit frame and the second transmit frame may be used to carry data.

FIG. 3 is a flowchart of Embodiment 1 of a data transmission method according to the present invention. As shown in FIG. 3, the method in this embodiment may include:

Step 301: A third site receives a first transmit frame transmitted by a first site to a second site, and acquires a transmission end moment of the first transmit frame.

Specifically, the third site obtains the transmission end moment of the first transmit frame by parsing frame header information of the first transmit frame.

Step 302: The third site transmits a second transmit frame to a fourth site, and instructs the fourth site to delay returning a response frame.

Step 303: The third site receives the response frame transmitted by the fourth site after at least one preset time length after transmission of the second transmit frame ends.

In this embodiment of the present invention, the third site is within a coverage area of the first site and the second site is outside a coverage area of the third site. That is, a site A and a site C can listen to each other, and a site B and the site A can listen to each other. However, the site B and the site C cannot listen to each other, that is, the third site is an exposed site of the first site and the second site.

In this embodiment of the present invention, after the second site completes the receiving of the first transmit frame transmitted by the first site, the second site needs to return a response frame to the first site as an acknowledgment to the first transmit frame transmitted by the first site. Similarly, after the fourth site completes the receiving of the second transmit frame transmitted by the third site, the fourth site needs to return a response frame to the third site as an acknowledgment for the second transmit frame transmitted by the third site.

In a current WLAN standard, two acknowledgment mechanisms are supported, that is, including two mechanisms for returning the response frame: immediate acknowledgment (Acknowledgment, ACK for short) and delayed block acknowledgment (Block Acknowledgment, BA for short). In the immediate ACK mechanism, a receiving site is required to transmit an ACK frame after a short interframe space (Short Interframe Space, SIFS for short) upon receiving a data frame. In the delayed BA mechanism, a transmitting site transmits a Basic Block ACK Request frame after a data frame is transmitted, and the receiving site returns an ACK1 frame as an acknowledgment for the Basic Block ACK Request frame after an SIFS. Then, the receiving site transmits a Basic Block ACK frame by means of contention, and after receiving the Basic Block ACK frame correctly, the transmitting site returns an ACK2 frame as an acknowledgment for the Basic Block ACK frame after an SIFS time.

Generally, lengths of the first transmit frame and the second transmit frame are different. When a transmission end moment of the second transmit frame is later than the transmission end moment of the first transmit frame, because the third site and the first site can listen to each other, transmission of the second transmit frame by the third site to the fourth site may affect receiving of the response frame by the first site, where the response frame is returned after the second site completes receiving of the first transmit frame, that is, a secondary communication link may affect efficiency of a primary communication link. Therefore, the transmission end moment of the second transmit frame cannot be later than the transmission end moment of the first transmit frame.

In this embodiment of the present invention, the third site needs to acquire the transmission end moment of the first transmit frame when the first site transmits the first transmit frame to the second site. Optionally, the third site obtains the transmission end moment of the first transmit frame by parsing the frame header information of the first transmit frame. Generally, a frame header is divided into two parts: a physical layer frame header and a MAC layer frame header (a frame header of a higher layer is not discussed herein because a WLAN protocol generally concerns only a physical layer and a MAC layer; the frame header of a higher layer is included in data of the WLAN protocol). An implementation solution in the present disclosure is not affected no matter information read from a frame header and involved in the present disclosure is extracted from the physical layer header or the MAC layer frame header; therefore, the physical layer header and the MAC layer frame header are collectively referred to as the frame header in the present disclosure. Specifically, an implementation manner is as follows: The third site may obtain duration of the first transmit frame by using a frame length and modulation and coding scheme (Modulation and Coding Scheme, MCS for short) information that are in a frame header, and obtains the transmission end moment of the first transmit frame according to a current moment or a transmission start moment of the first transmit frame (the receiving site may obtain a transmission time length of the frame header by using a frame format of the received frame, and may obtain the transmission start moment of the first transmit frame by subtracting the transmission time length of the frame header from the current moment). The MCS information includes modulation information and information about a quantity of spatial flows. It is assumed that the frame length is N bytes and the quantity of spatial flows is n, when the indicated modulation information is used, each OFDM symbol can contain information of k bytes (a single spatial flow), and a time length of each OFDM symbol is to Therefore, duration t of the first transmit frame is $$t = \left\lceil \frac{8N}{nk} \right\rceil t_0,$$

where $\lceil f \rceil$ represents a round-up function.

A specific calculation manner may be determined according to an actual situation. For example, when the physical layer frame header is not considered, a transmission time length of the physical layer frame header needs to be increased; when length padding is performed at the physical layer, a time length occupied by a padded length needs to be considered, and so on. FIG. 4 is a schematic diagram of a data transmission method 1 according to the present invention. Because the third site needs to obtain the transmission end moment of the first transmit frame by parsing the frame header information of the first transmit frame, a transmission start moment of the second transmit frame is later than the transmission start moment of the first transmit frame. As shown in FIG. 4, the transmission start moment of the second transmit frame may be specifically later than a frame body start moment of the first transmit frame, and a difference between the transmission start moment of the second transmit frame and a frame header end moment of the first transmit frame is a processing delay of the second transmit frame. As shown in FIG. 4, duration of the second transmit frame cannot exceed a calculation result of duration of the first transmit frame—duration of the frame header—the processing delay of the second transmit frame.

In this embodiment of the present invention, to avoid interference of the secondary communication link with the primary communication link to a most extent, the transmission end moment of the second transmit frame is not later than the transmission end moment of the first transmit frame, that is, the transmission end moment of the second transmit frame is earlier than the transmission end moment of the first transmit frame, or transmission of the second transmit frame and that of the first transmit frame end simultaneously. If the existing immediate ACK mechanism or the delayed BA acknowledgment mechanism is used, because the fourth site and the second site can listen to each other, the returning of the response frame to the third site by the fourth site after the second transmit frame is received may affect the receiving, by the second site, the first transmit frame transmitted by the first site, that is, the secondary communication link may affect the efficiency of the primary communication link.

To avoid interference of an acknowledgment frame on the secondary link with the primary link, further, in this embodiment of the present invention, the third site transmits the second transmit frame to the fourth site, and instructs the fourth site to delay returning the response frame, so that the fourth site transmits the response frame to the third site after at least one preset time length after receiving of the second transmit frame ends. That is, time when the receiving site (the fourth site) of the second transmit frame returns the response frame cannot overlap with receiving time of the first transmit frame. The preset time length is greater than or equal to a difference between the transmission end moment of the first transmit frame and the transmission end moment of the second transmit frame. Preferably, in this embodiment of the present invention, the fourth site is outside the coverage area of the first site.

In this embodiment of the present invention, as shown in FIG. 4, after completing the receiving of the first transmit frame, the second site may use the existing immediate acknowledgment mechanism or the delayed BA mechanism to return the response frame, for example, the ACK1, to the first site. The third site starts to transmit the second transmit frame to the fourth site after a processing delay that follows the frame header end moment of the first transmit frame, and instructs the fourth site to delay returning the response frame, so that the fourth site directly transmits the response frame, for example, the ACK2, to the third site after at least the preset time length shown in FIG. 4 after receiving of the second transmit frame ends. Alternatively, the fourth site may also transmit the response frame to the third site after successful channel re-contention, or may wait to return the response frame after an SIFS time following transmission of a response request frame by the third site. Processing delay time herein may be counted from frame header end time, or may be counted from a moment at which necessary information (for example, an address of the receiving site, that is, identification information of the second site, and an address of the transmitting site, that is, identification information of the first site) is extracted from the frame header. Specifically, a calculation manner to be used may be determined according to a specific definition in an implementation system. For ease of description, it is considered that counting of the processing delay starts from the frame header end moment herein. The processing delay is introduced because after the third site receives the frame header, time is needed separately for parsing the frame header and for changing a receiving state to a transmit state. A specific required delay time length is related to complexity of frame header parsing and an operation speed of the third site, and a specific value is not discussed herein. The third site may obtain the transmission end moment of the first transmit frame by parsing the frame header information of the first transmit frame, and the third site may determine the transmission end moment of the second transmit frame based on a principle that the transmission end moment of the second transmit frame is not later than the transmission end moment of the first transmit frame, so that the preset time length is obtained according to that the preset time length is greater than or equal to the difference between the transmission end moment of the first transmit frame and the transmission end moment of the second transmit frame.

Optionally, a first implementation manner is: The third site transmits the second transmit frame to the fourth site, where the second transmit frame includes the preset time length, so that the fourth site returns the response frame after at least the preset time length after receiving of the second transmit frame ends.

FIG. 5 is a schematic diagram 1 of a frame format of a data frame, and FIG. 6 is a schematic diagram 2 of a frame format of a data frame. Specifically, as shown in FIG. 6, in this embodiment of the present invention, a new delay time field (that is, a preset time length field) of a response frame may be added to an existing data frame format, or another carrying manner, such as an existing field shown in FIG. 5, may be reused.

Optionally, a second implementation manner is: The third site transmits the second transmit frame to the fourth site, and transmits, to the fourth site, notification signaling including the preset time length, so that the fourth site returns the response frame after at least the preset time length after receiving of the second transmit frame ends.

In this embodiment of the present invention, when the third site transmits the second transmit frame to the fourth site, or before the third site transmits the second transmit frame to the fourth site, or after the third site transmits the second transmit frame to the fourth site, the notification signaling including the preset time length is transmitted to the fourth site, so that the fourth site transmits the response frame to the third site after waiting for at least the preset time length upon receiving the second transmit frame.

Optionally, a third implementation manner is: The third site transmits the second transmit frame to the fourth site, where the second transmit frame includes information used to instruct the fourth site temporarily not to return the response frame after the second transmit frame is received; in addition, the third site transmits a response request frame to the fourth site after at least the preset time length after the transmission of the second transmit frame ends, where the response request frame is used to instruct the fourth site to return the response frame.

If the fourth site uses the existing immediate acknowledgment mechanism, the fourth site returns the response frame to the third site after an SIFS upon receiving the second transmit frame, which may affect the receiving of the first transmit frame by the second site. Therefore, in this embodiment of the present invention, the third site may transmit the second transmit frame to the fourth site, where the second transmit frame includes the information used to instruct the fourth site temporarily not to return the response frame after the second transmit frame is received. Specifically, a manner of carrying the indication information in an existing frame may be used, for example, a manner in which a new indication information field is added to the existing frame format, or an existing field is reused. Further, the third site transmits, to the fourth site after at least the preset time length after the transmission of the second transmit frame ends, indication information used to instruct the fourth site to return the response frame, so that the fourth site transmits the response frame to the third site after at least the preset time length after receiving of the second transmit frame ends, which ensures that the receiving the first transmit frame by the receiving site is not interfered when the receiving site of the second transmit frame returns the response frame.

Description above may be concluded as follows: The third site transmits the second transmit frame to the fourth site, and instructs the fourth site to delay returning the response frame; after at least the preset time length after the transmission of the second transmit frame ends, the third site receives the response frame transmitted by the fourth site. It should be noted herein that the foregoing limitations on a transmission time length of the second transmit frame and a delay time of the response frame are set only for a case in which a link resource used by the first site to transmit a data frame to the second site is reused. In another scenario, the second transmit frame is not necessarily set according to the first transmit frame. Further, the transmission time length of the second transmit frame and the delay time of the response frame are not subject to the foregoing limitations either, but are set according to a specific application scenario. For example, in a case in which an AP divides transmission time into uplink time and downlink time respectively for transmitting and receiving, when the second transmit frame is transmitted by the AP to a site, an end time of the transmission cannot exceed a downlink end point, and the delay time of the response frame, that is, the preset time length, needs to be greater than a difference between the end moment of the second transmit frame and a downlink end moment. When the second transmit frame is transmitted by a site to the AP, the transmission time length cannot exceed an uplink end point, and the delay time of the response frame needs to be greater than a difference between the transmission end moment of the second transmit frame and an uplink end moment.

Further, in this embodiment of the present invention, the third site receives, after at least the preset time length after the transmission of the second transmit frame ends, the response frame transmitted by the fourth site.

In this embodiment of the present invention, a third site transmits a second transmit frame to a fourth site by acquiring a transmission end moment of a first transmit frame that is currently transmitted by a first site to a second site, instructs the fourth site to delay returning a response frame, and after at least one preset time length after transmission of the second transmit frame ends, receives the response frame transmitted by the fourth site. A transmission end moment of the second transmit frame is not later than the transmission end moment of the first transmit frame, and the preset time length is greater than or equal to a difference between the transmission end moment of the first transmit frame and the transmission end moment of the second transmit frame, so that the fourth site returns the response frame after waiting for at least the preset time length upon receiving the second transmit frame. In this way, the third site can also transmit data when the first site transmits data, which improves system transmission efficiency.

Optionally, before the third site receives the first transmit frame transmitted by the first site to the second site, the method further includes: establishing, by the third site, a list of neighbor sites.

In the existing WLAN system, a site may obtain identification information of a neighbor site by listening to frame header information of a transmit frame currently transmitted by the neighbor site, and establishes a list of neighbor sites, or may obtain identification information of a neighbor site by actively transmitting a request frame and then receiving a response frame of the neighbor site. The neighbor site is a site that can listen to the site and can be listened to by the site.

In the present disclosure, it is assumed that a mutual location relationship between two sites is equal, that is, if one site is within a coverage area of the other site, correspondingly, the other site is also within a coverage area of the one site. This is based on that channel fading is the same or approximately the same between the two sites. In a case in which transmit power is the same, channel strength received by a receiving end and a packet error rate are basically the same when a signal is transmitted from the one site to the other site and when a signal is transmitted from the other site to the site. The present invention is performed based on this situation. If the coverage areas of the two sites are different due to their different transmit powers, fairness between the two sites is affected. In this case, the two sites need to use another mechanism to obtain the list of neighbor sites (for example, each site first transmits, to an AP associated with each site, a preliminarily determined list of neighbor sites acquired by each site, the AP determines a list of neighbor sites of each site by means of negotiation, and then transmits the list of neighbor sites to each site). Because a process of each site of acquiring a list of neighbor sites does not affect another implementation step of the present invention, and therefore is not further discussed herein.

Optionally, before the third site acquires the transmission end moment of the first transmit frame, the method may further include: parsing, by the third site, the frame header information of the first transmit frame, and acquiring identification information of a receiving site that receives the first transmit frame; determining, by the third site, whether the identification information of the receiving site is in the list of neighbor sites of the third site; if the identification information of the receiving site is not in the list of neighbor sites of the third site, executing the operation of acquiring a transmission end moment of the first transmit frame.

In this embodiment of the present invention, the third site may parse the frame header information of the first transmit frame, and acquires the identification information of the receiving site (that is, the second site) of the first transmit frame, for example, a MAC address. Then, the third site determines whether the identification information of the receiving site is in the list of neighbor sites of the third site, and if the identification information of the receiving site is in the list of neighbor sites of the third site, the third site determines that the third site itself is not an exposed site to the first site and the receiving site, that is, when the third site transmits data to the fourth site, the efficiency of the primary communication link is affected. Therefore, the third site cannot transmit data and cannot execute the operation of acquiring a transmission end moment of the first transmit frame. If the identification information of the receiving site is not in the list of neighbor sites of the third site, the third site determines that the third site is an exposed site to the first site and the receiving site (that is, the second site) and can execute the operation of acquiring a transmission end moment of the first transmit frame.

Optionally, before the third site transmits the second transmit frame to the fourth site, the method may further include: determining, by the third site, that the first site is a transmit opportunity holding node of the third site.

In the WLAN system, a physical carrier sense mechanism or a virtual carrier sense mechanism may be used. In the physical carrier sense mechanism, it is determined, by listening to signal energy in a channel, whether the current channel is idle or busy. In the virtual carrier sense mechanism, after a site occupies a channel, the site sets a value of Duration1 in a transmit frame, and after a non-target receiving site of the transmit frame receives the transmit frame, sets the value of Duration1 as a NAV of the site, where no data is transmitted within the duration. Moreover, if the non-target receiving site receives a frame whose time is Duration2 before current NAV time ends, and more time than the current NAV needs to be reserved according to Duration2, a value of Duration2 is updated to a NAV value of the non-target receiving site. A site that finally sets the NAV for the non-target receiving site is a transmit opportunity holder or a transmit opportunity holding node (TXOP holder) of the non-target receiving site. The NAV may be set by transmitting, by the site, a control frame such as an RTS frame, a CTS frame, or a CTS-to-self frame, or may be set by directly using a data frame.

In the foregoing embodiment of the present invention, a site uses a manner in which the site determines whether the site itself is an exposed site according to whether a receiving site of a current transmit frame of a neighbor site of the site is in a list of neighbor sites of the site, so that the site may obtain many opportunities of reusing a communication link resource undergoing transmission. However, when the manner is used, a frame of a non-transmit opportunity holder may be reused, which interferes with data transmission of the transmit opportunity holder. Further, in this embodiment of the present invention, before the third site transmits the second transmit frame to the fourth site (before the third site reuses a resource of the primary communication link), it may first be determined that the first site currently transmitting the first transmit frame is the transmit opportunity holding node of the third site. Specifically, in this embodiment of the present invention, the third site may determine whether the first site is the transmit opportunity holding node of the third site by detecting whether a transmit address of an RTS frame, a CTS frame, a CTS-to-self frame, or the first transmit frame is a MAC address of the transmit opportunity holding node of the third site. When the transmit address of the RTS frame, the CTS frame, the CTS-to-self frame, or the first transmit frame is the MAC address of the transmit opportunity holding node of the third site, the first site is the transmit opportunity holding node of the third site. Further, the third site may use the foregoing manner in this embodiment of the present invention to reuse the communication link resource undergoing transmission. Otherwise, the first site is not the transmit opportunity holding node of the third site, and to avoid interfering with the data transmission of the transmit opportunity holding node, the third site does not reuse the resource, that is, the third site does not transmit data.

Further, for a same primary transmit link or primary communication link, there may be multiple exposed links. For example, for a communication link between the first site and the second site, there may be multiple secondary communication links that satisfy conditions of the third site and the fourth site in the foregoing embodiment of the present invention. If the multiple exposure links are not exposed links to each other (that is, an exposed link may interfere with a receiving site of another exposed link), collision occurs when the multiple exposed links transmit the foregoing second transmit frame at the same time. When there is only one exposed site and the exposed site selects an improper site, the receiving site of the second transmit frame may be interfered with by the first transmit frame. Preferably, in this embodiment of the present invention, the fourth site is outside the coverage area of the first site.

In this embodiment of the present invention, these two types of potential collisions may be not processed, and a collision is only considered as a performance loss, or the following solutions may be used to reduce a collision probability of an exposed link.

In a first implementation solution, in the WLAN system, two links that are exposed links to each other are classified into one group, and when one link thereof performs transmission, all other links within the group may perform transmission at the same time. In a second implementation solution, when the primary communication link performs transmission, a transmitting site of the primary communication link schedules one or more links (or a group of links) for transmission. In a third implementation solution, an exposed site performs transmission at a probability, so as to reduce a probability of collisions between the multiple exposed links. For example, a value p ($0 \leq p \leq 1$) is preset, and a random number is generated before the exposed site performs transmission. If the random number is less than p, the second transmit frame is transmitted, or otherwise, the second transmit frame is not transmitted.

FIG. 7 is a flowchart of Embodiment 2 of a data transmission method according to the present invention. As shown in FIG. 7, the method in this embodiment may include:

Step 701: A fourth site receives a second transmit frame and indication information that are transmitted by a third site, where the indication information instructs the fourth site to delay returning a response frame.

Step 702: The fourth site transmits the response frame to the third site according to the indication information after at least one preset time length after receiving of the second transmit frame ends.

In this embodiment of the present invention, after the fourth site completes the receiving of the second transmit frame transmitted by the third site, the fourth site needs to return the response frame to the third site as an acknowledgment of the second transmit frame transmitted by the third site. A current WLAN standard supports two acknowledgment mechanisms, that is, includes two mechanisms for returning the response frame: immediate ACK and delayed BA acknowledgment. If the existing immediate ACK or the delayed BA acknowledgment mechanism is used, because the fourth site and a second site can listen to each other, the returning of the response frame to the third site by the fourth site after the second transmit frame is received may affect the receiving, by the second site, the first transmit frame transmitted by the first site, that is, a secondary communication link may affect efficiency of a primary communication link. Therefore, in this embodiment of the present invention, to avoid interference of the secondary communication link with the primary communication link to a most extent, the fourth site receives the second transmit frame and the indication information that are transmitted by the third site, where the indication information instructs the fourth site to delay, after the second transmit frame is received, returning the response frame, and transmits the response frame to the third site according to the indication information after at least the preset time length after receiving of the second transmit frame ends. On a basis that existing communication link efficiency is not affected, to reuse a communication link resource undergoing transmission, in this embodiment of the present invention, a transmission end moment of the second transmit frame is not later than a transmission end moment of the first transmit frame transmitted by the first site to the second site. The third site is within a coverage area of the first site and the second site is outside a coverage area of the third site.

In this embodiment of the present invention, the fourth site receives the second transmit frame and the indication information that are transmitted by the third site, where the indication information instructs the fourth site to delay, after the second transmit frame is received, returning the response frame. Optionally, in a first implementation manner, the fourth site receives the second transmit frame transmitted by the third site, where the second transmit frame includes the preset time length; correspondingly, the fourth site transmits the response frame to the third frame according to the second transmit frame after at least the preset time length after receiving of the second transmit frame ends. Optionally, after the fourth site receives the indication information, the existing immediate acknowledgment mechanism or the delayed BA mechanism may be used to transmit the response frame to the third site. Alternatively, the fourth site may also contend for a channel again, and transmits the response frame to the third site when the channel is idle, as shown in FIG. 4.

Optionally, in a second implementation manner, the fourth site receives the second transmit frame and notification signaling that are transmitted by the third site, where the notification signaling includes the preset time length; correspondingly, the fourth site transmits the response frame to the third site according to the notification signaling after at least the preset time length after receiving of the second transmit frame ends.

Optionally, in a third implementation manner, the fourth site receives the second transmit frame transmitted by the third site, where the second transmit frame includes information used to instruct the fourth site temporarily not to return the response frame after the second transmit frame is received; the fourth site receives a response request frame transmitted by the third site after at least the preset time length after transmission of the second transmit frame ends, where the response request frame is used to instruct the fourth site to return the response frame; correspondingly, the fourth site transmits the response frame to the third site according to the response request frame.

In this embodiment of the present invention, preferably, the fourth site is within a coverage area of the third site and the fourth site is outside a coverage area of the first site, so as to ensure that the secondary communication link does not affect the efficiency of the primary communication link. The preset time length is greater than or equal to a difference between the transmission end moment of the first transmit frame and the transmission end moment of the second transmit frame. For transmission details of the indication information, specifically, reference may be made to Embodiment 1 of the foregoing data transmission method, and details are not described in this embodiment of the present invention again.

In this embodiment of the present invention, a fourth site receives a second transmit frame and indication information that are transmitted by a third site, where the indication information instructs the fourth site to delay returns a response frame, and transmits the response frame to the third site according to the indication information after waiting for at least one preset time length upon receiving the second transmit frame. A transmission end moment of the second transmit frame is not later than a transmission end moment of a first transmit frame transmitted by a first site to a second site, which implements that the third site can also transmit data when the first site transmits data, thereby improving system transmission efficiency.

The current WLAN standard supports two acknowledgment mechanisms, that is, includes two mechanisms for returning the response frame: the ACK and the BA. As shown in FIG. 2, when a site A transmits data to a site B, a site C can also transmit data to a site D, and in addition, the site D needs to return a response frame to the site C after the data transmitted by the site C is received. Because lengths of data frames respectively transmitted by the site A and the site C are generally different, if the site D uses the existing acknowledgment mechanism to return the response frame to the site C, the returning of the response frame by the site D to the site C may affect the receiving, by the site B, of the data transmitted by the site A because the site B and the site D can listen to each other. As a result, the secondary communication link affects the efficiency of the primary communication link.

Optionally, in this embodiment of the present invention, a data frame transmitted by the site C to the site D may correspond to the first transmit frame in this embodiment of the present invention, a data frame transmitted by the site A to the site B may correspond to the second transmit frame in this embodiment of the present invention, a communication link between the site A and the site B is the primary communication link, and a communication link between the site C and the site D is the secondary communication link. Both the first transmit frame and the second transmit frame may be used to carry data.

FIG. 8 is a flowchart of Embodiment 3 of a data transmission method according to the present invention. As shown in FIG. 8, the method in this embodiment may include:

Step 801: A first site transmits a first transmit frame to a second site, and instructs the second site to delay returning a response frame.

Step 802: The first site receives the response frame transmitted by the second site after at least one preset time length after transmission of the first transmit frame ends.

Optionally, before the first site transmits the first transmit frame to the second site, the method may further include: receiving, by the first site, a second transmit frame transmitted by a third site to a fourth site, and acquiring a transmission end moment of the second transmit frame.

In this embodiment of the present, for a specific process in which the first site receives the second transmit frame transmitted by the third site to the fourth site, and acquires the transmission end moment of the second transmit frame, reference may be made to a process, in Embodiment 1 of the foregoing data transmission method, in which the third site receives the first transmit frame transmitted by the first site to the second site, and acquires a transmission end moment of the first transmit frame. Details are not described in this embodiment of the present invention again.

In this embodiment of the present invention, after the second site completes the receiving of the first transmit frame transmitted by the first site, the second site needs to return the response frame to the first site as an acknowledgment to the first transmit frame transmitted by the first site. Optionally, to avoid interference of a secondary communication link with a primary communication link to a most extent, the transmission end moment of the first transmit frame is not later than the transmission end moment of the second transmit frame, that is, the transmission end moment of the first transmit frame is earlier than the transmission end moment of the second transmit frame, or the transmission of the first transmit frame and that of the second transmit frame end at the same time. If an existing immediate ACK or the delayed BA acknowledgment mechanism is used, because the second site and the fourth site can listen to each other, the returning of the response frame by the second site to the first site after the first transmit frame is received may affect the receiving, by the fourth site, the second transmit frame transmitted by the third site. Therefore, to avoid interference of an acknowledgment frame on the secondary link with the primary link, further, in this embodiment of the present invention, the first site transmits the first transmit frame to the second site, and instructs the second site to delay returning the response frame. Preferably, the first site is within a coverage area of the third site and the fourth site is outside a coverage area of the first site, and the second site is outside a coverage area of the third site.

Optionally, in a first implementation manner, the first site transmits the first transmit frame to the second site, where the first transmit frame includes the preset time length, so that the second site returns the response frame after at least the preset time length after receiving of the first transmit frame ends.

Optionally, in a second implementation manner, the first site transmits the first transmit frame to the second site, and transmits, to the second site, notification signaling including the preset time length, so that the second site returns the response frame after at least the preset time length after receiving of the first transmit frame ends.

Optionally, in a third implementation manner, the first site transmits the first transmit frame to the second site, where the first transmit frame includes information used to instruct the second site temporarily not to return the response frame after the first transmit frame is received; and the first site transmits a response request frame to the second site after at least the preset time length after the transmission of the first transmit frame ends, where the response request frame is used to instruct the second site to return the response frame.

In this embodiment of the present invention, the preset time length may be greater than or equal to a difference between the transmission end moment of the second transmit frame and the transmission end moment of the first transmit frame. Optionally, for a specific implementation manner in which the first site transmits the first transmit frame to the second site, and instructs the second site to delay returning the response frame, reference may be made to a process, in Embodiment 1 of the foregoing data transmission method, in which the third site transmits the second transmit frame to the fourth site, and instructs the fourth site to delay returning the response frame. Details are not described in this embodiment of the present invention again.

Further, the first site receives the response frame transmitted by the second site after at least the preset time length after the transmission of the first transmit frame ends.

In this embodiment of the present invention, a first site transmits a first transmit frame to a second site, instructs the second site to delay returning a response frame, and receives the response frame transmitted by the second site after at least one preset time length after transmission of the first transmit frame ends, so that the second site returns the response frame after waiting for at least the preset time length upon receiving the first transmit frame. In this way, the first site can also transmit data when a third site transmits data, which improves system transmission efficiency.

Optionally, before the first site receives the second transmit frame transmitted by the third site to the fourth site, the method further includes: establishing, by the first site, a list of neighbor sites.

Optionally, before the first site acquires the transmission end moment of the second transmit frame, the method further includes: parsing, by the first site, frame header information of the second transmit frame, and acquiring identification information of a receiving site that receives the second transmit frame; determining, by the first site, whether the identification information of the receiving site is in the list of neighbor sites of the first site; if the identification information of the receiving site is not in the list of neighbor sites of the first site, determining, by the first site, that the first site itself is an exposed site, and executing the operation of acquiring a transmission end moment of the second transmit frame.

Optionally, before the first site transmits the first transmit frame to the second site, the method further includes: determining, by the first site, that the third site is a transmit opportunity holding node of the first site.

FIG. 9 is a flowchart of Embodiment 4 of a data transmission method according to the present invention. As shown in FIG. 9, the method in this embodiment may include:

Step 901: A second site receives a first transmit frame and indication information that are transmitted by a first site, where the indication information instructs the second site to delay returning a response frame.

Step 902: The second site transmits the response frame to the first site according to the indication information after at least one preset time length after receiving of the first transmit frame ends.

In this embodiment of the present invention, the second site receives the first transmit frame and the indication information that are transmitted by the first site, where the indication information instructs the second site to delay returning the response frame. Optionally, in a first implementation manner, the second site receives the first transmit frame transmitted by the first site, where the first transmit frame includes the preset time length; correspondingly, the second site transmits the response frame to the first site according to the first transmit frame after at least the preset time length after receiving of the first transmit frame ends. Optionally, after receiving the indication information, the second site may use an existing immediate acknowledgment mechanism or delayed BA mechanism to transmit the response frame to the first site. Alternatively, the second site may also contend for a channel again, and transmits the response frame to the first site when the channel is idle.

Optionally, in a second implementation manner, the second site receives the first transmit frame and notification signaling that are transmitted by the first site, where the notification signaling includes the preset time length; correspondingly, the second site transmits the response frame to the first site according to the notification signaling after at least the preset time length after receiving of the first transmit frame ends.

Optionally, in a third implementation manner, the second site receives the first transmit frame transmitted by the first site, where the first transmit frame includes information used to instruct the second site temporarily not to return the response frame after the first transmit frame is received; the second site receives a response request frame transmitted by the first site after at least the preset time length after transmission of the first transmit frame ends, where the response request frame is used to instruct the second site to return the response frame; correspondingly, the second site transmits the response frame to the first site according to the response request frame.

In this embodiment of the present invention, preferably, the second site is within a coverage area of the first site and the second site is outside a coverage area of the third site, so as to ensure that a secondary communication link does not affect efficiency of a primary communication link. The preset time length is greater than or equal to a difference between a transmission end moment of the second transmit frame and a transmission end moment of the first transmit frame. For transmission details of the indication information, reference may be made to Embodiment 3 of the foregoing data transmission method. Details are not described in this embodiment of the present invention again.

In this embodiment of the present invention, a second site receives a first transmit frame and indication information that are transmitted by a first site, where the indication information instructs the second site to delay returning a response frame, and transmits the response frame to the first site according to the indication information after at least one preset time length after receiving of the first transmit frame ends. In this way, the first site can also transmit data when a third site transmits data, which improves system transmission efficiency.

Figure 10:
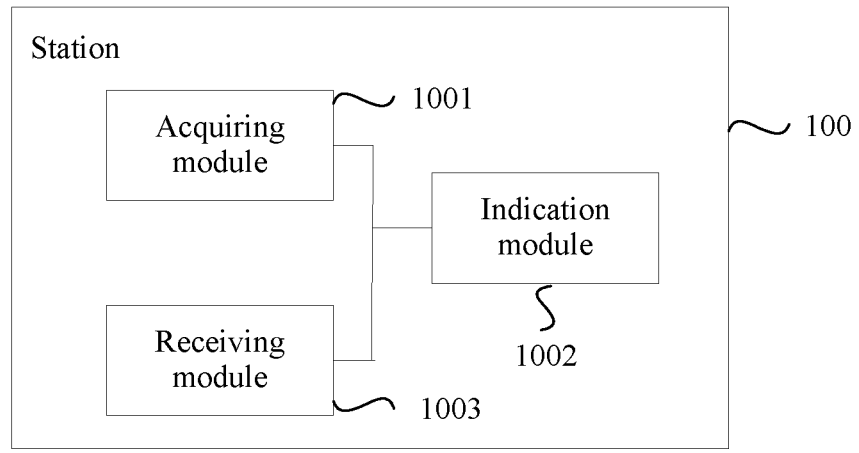
FIG. 10 is a schematic structural diagram of Embodiment 1 of a site according to the present invention.

FIG. 10 is a schematic structural diagram of Embodiment 1 of a site according to the present invention. The site in this embodiment of the present invention may be a third site. As shown in FIG. 10, a site 100 provided in this embodiment of the present invention includes: an acquiring module 1001, an indication module 1002, and a receiving module 1003.

The acquiring module 1001 is configured to: receive a first transmit frame transmitted by a first site to a second site, and acquire a transmission end moment of the first transmit frame;

the indication module 1002 is configured to: transmit a second transmit frame to a fourth site, and instruct the fourth site to delay returning a response frame; and the receiving module 1003 is configured to receive the response frame transmitted by the fourth site after at least one preset time length after transmission of the second transmit frame ends;

where the third site is within a coverage area of the first site, and the second site is outside a coverage area of the third site; a transmission end moment of the second transmit frame is not later than the transmission end moment of the first transmit frame, and the preset time length is greater than or equal to a difference between the transmission end moment of the first transmit frame and the transmission end moment of the second transmit frame.

Optionally, the acquiring module 1001 is specifically configured to obtain the transmission end moment of the first transmit frame by parsing frame header information of the first transmit frame.

Optionally, the indication module 1002 is specifically configured to: transmit the second transmit frame to the fourth site, where the second transmit frame includes the preset time length, so that the fourth site returns the response frame after at least the preset time length after receiving of the second transmit frame ends;

or transmit the second transmit frame to the fourth site, and transmit, to the fourth site, notification signaling including the preset time length, so that the fourth site returns the response frame after at least the preset time length after receiving of the second transmit frame ends;

or transmit the second transmit frame to the fourth site, where the second transmit frame includes information used to instruct the fourth site temporarily not to return the response frame after the second transmit frame is received; and transmit a response request frame to the fourth site after at least the preset time length after the transmission of the second transmit frame ends, where the response request frame is used to instruct the fourth site to return the response frame.

Optionally, the site 100 may further include: a first determining module, configured to determine that the first site is a transmission opportunity holding node of the third site.

Optionally, the site may further include: an establishing module, configured to establish a list of neighbor sites.

Optionally, the site may further include:

a parsing module, configured to: parse the frame header information of the first transmit frame, and acquire identification information of a receiving site that receives the first transmit frame; and a second determining module, configured to determine whether the identification information of the receiving site is in the list of neighbor sites of the third site; and if the identification information of the receiving site is not in the list of neighbor sites of the third site, the acquiring module is configured to execute the operation of acquiring a transmission end moment of the first transmit frame.

The site in this embodiment may be used for the technical solution in Embodiment 1 of the data transmission method, and implementation principles and technical effects thereof are similar and are not described herein again.

Figure 11:
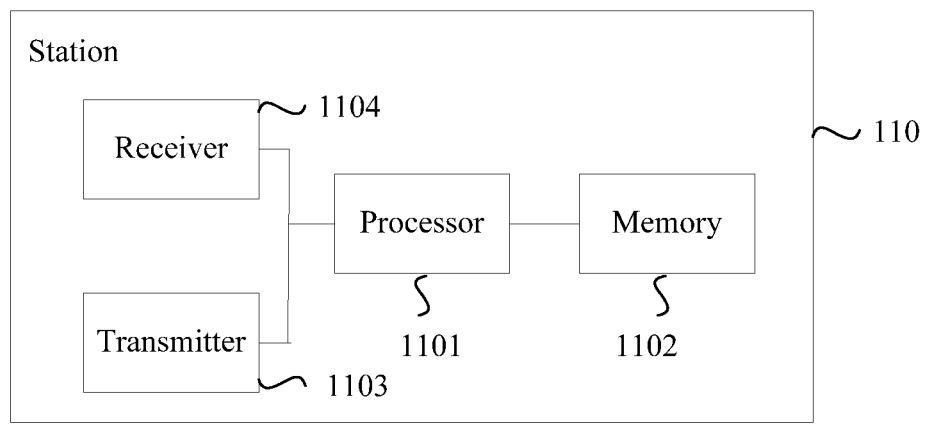
FIG. 11 is a schematic structural diagram of Embodiment 2 of a site according to the present invention.

FIG. 11 is a schematic structural diagram of Embodiment 2 of a site according to the present invention. The site in this embodiment of the present invention may be a third site. As shown in FIG. 11, a site 110 provided in this embodiment includes a processor 1101 and a memory 1102. The site 110 may further include a transmitter 1103 and a receiver 1104. The transmitter 1103 and the receiver 1104 may be connected to the processor 1101. The transmitter 1103 is configured to transmit data or information, the receiver 1104 is configured to receive data or information, and the memory 1102 is configured to store an execution instruction. When the site 110 runs, the processor 1101 communicates with the memory 1102, and the processor 1101 invokes the execution instruction in the memory 1102 to execute an operation in Embodiment 1 of the foregoing data transmission method.

The site in this embodiment may be configured to execute the technical solution in Embodiment 1 of the foregoing data transmission method of the present invention, and implementation principles and technical effects thereof are similar and are not described herein again.

Figure 12:
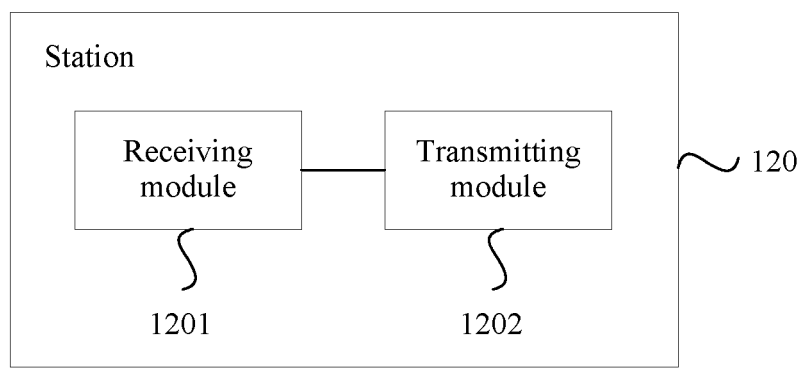
FIG. 12 is a schematic structural diagram of Embodiment 3 of a site according to the present invention.

FIG. 12 is a schematic structural diagram of Embodiment 3 of a site according to the present invention. The site in this embodiment of the present invention may be a fourth site. As shown in FIG. 12, a site 120 provided in this embodiment includes a receiving module 1201 and a transmitting module 1202.

The receiving module 1201 is configured to receive a second transmit frame and indication information that are transmitted by a third site, where the indication information instructs the fourth site to delay returning a response frame, and a transmission end moment of the second transmit frame is not later than a transmission end moment of a first transmit frame transmitted by a first site to a second site; and the transmitting module 1202 is configured to transmit the response frame to the third site according to the indication information after at least one preset time length after receiving of the second transmit frame ends;

where the third site is within a coverage area of the first site, and the second site is outside a coverage area of the third site; the preset time length is greater than or equal to a difference between the transmission end moment of the first transmit frame and the transmission end moment of the second transmit frame.

Optionally, the receiving module 1201 is specifically configured to receive the second transmit frame transmitted by the third site, where the second transmit frame includes the preset time length; and correspondingly, the transmitting module 1202 is specifically configured to transmit the response frame to the third site according to the second transmit frame after at least the preset time length after receiving of the second transmit frame ends; or the receiving module 1201 is further specifically configured to receive the second transmit frame and notification signaling that are transmitted by the third site, where the notification signaling includes the preset time length; and correspondingly, the transmitting module 1202 is further specifically configured to transmit the response frame to the third site according to the notification signaling after at least the preset time length after receiving of the second transmit frame ends; or the receiving module 1201 is further specifically configured to: receive the second transmit frame transmitted by the third site, where the second transmit frame includes information used to instruct the fourth site temporarily not to return the response frame after the second transmit frame is received, and receive a response request frame transmitted by the third site after at least the preset time length after transmission of the second transmit frame ends, where the response request frame is used to instruct the fourth site to return the response frame; and correspondingly, the transmitting module 1202 is further specifically configured to transmit the response frame to the third site according to the response request frame.

The site in this embodiment may be used for the technical solution in Embodiment 2 of the data transmission method, and implementation principles and technical effects thereof are similar and are not described herein again.

Figure 13:
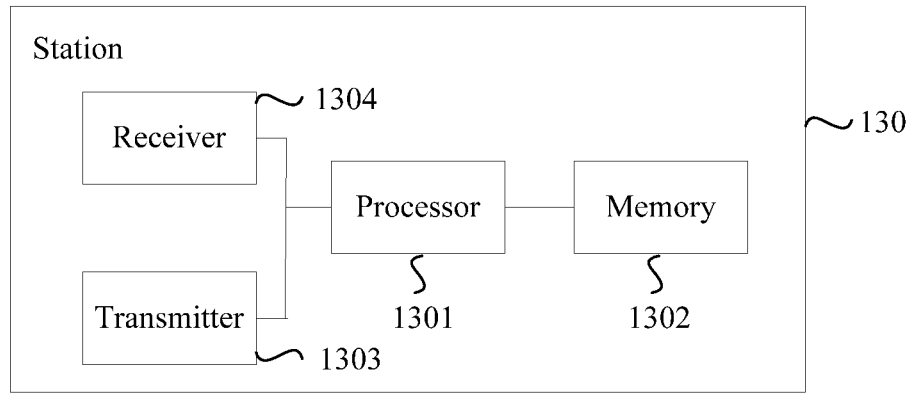
FIG. 13 is a schematic structural diagram of Embodiment 4 of a site according to the present invention.

FIG. 13 is a schematic structural diagram of Embodiment 4 of a site according to the present invention. The site in this embodiment of the present invention may be a fourth site. As shown in FIG. 13, a site 130 provided in this embodiment includes a processor 1301 and a memory 1302. The site 130 may further include a transmitter 1303 and a receiver 1304. The transmitter 1303 and the receiver 1304 may be connected to the processor 1301. The transmitter 1303 is configured to transmit data or information, the receiver 1304 is configured to receive data or information, and the memory 1302 is configured to store an execution instruction. When the site 130 runs, the processor 1301 communicates with the memory 1302, and the processor 1301 invokes the execution instruction in the memory 1302 to execute an operation in Embodiment 2 of the foregoing data transmission method.

The site in this embodiment may be configured to execute the technical solution in Embodiment 2 of the foregoing data transmission method of the present invention, and implementation principles and technical effects thereof are similar and are not described herein again.

Figure 14:
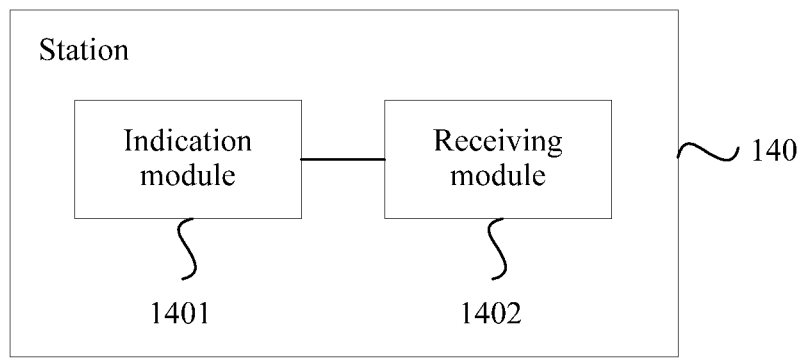
FIG. 14 is a schematic structural diagram of Embodiment 5 of a site according to the present invention.

FIG. 14 is a schematic structural diagram of Embodiment 5 of a site according to the present invention. The site in this embodiment of the present invention may be a first site. As shown in FIG. 14, a site 140 provided in this embodiment includes an indication module 1401 and a receiving module 1402.

The indication module 1401 is configured to: transmit a first transmit frame to a second site, and instruct the second site to delay returning a response frame; and the receiving module 1402 is configured to receive, after at least one preset time length after transmission of the first transmit frame ends, the response frame transmitted by the second site.

Optionally, the indication module 1401 is specifically configured to: transmit the first transmit frame to the second site, where the first transmit frame includes the preset time length, so that the second site returns the response frame after at least the preset time length after receiving of the first transmit frame ends; or transmit the first transmit frame to the second site, and transmit, to the second site, notification signaling including the preset time length, so that the second site returns the response frame after at least the preset time length after receiving of the first transmit frame ends;

or transmit the first transmit frame to the second site, where the first transmit frame includes information used to instruct the second site temporarily not to return the response frame after the first transmit frame is received; and transmit a response request frame to the second site after at least the preset time length after the transmission of the first transmit frame ends, where the response request frame is used to instruct the second site to return the response frame.

The site in this embodiment may be used for the technical solution in Embodiment 3 of the data transmission method, and implementation principles and technical effects thereof are similar and are not described herein again.

Figure 15:
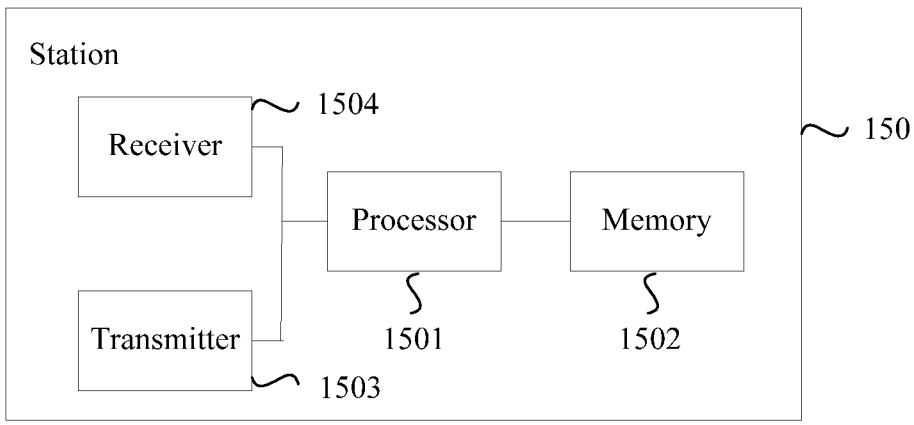
FIG. 15 is a schematic structural diagram of Embodiment 6 of a site according to the present invention.

FIG. 15 is a schematic structural diagram of Embodiment 6 of a site according to the present invention. The site in this embodiment of the present invention may be a first site. As shown in FIG. 15, a site 150 provided in this embodiment includes a processor 1501 and a memory 1502. The site 150 may further include a transmitter 1503 and a receiver 1504. The transmitter 1503 and the receiver 1504 may be connected to the processor 1501. The transmitter 1503 is configured to transmit data or information, the receiver 1504 is configured to receive data or information, and the memory 1502 is configured to store an execution instruction. When the site 150 runs, the processor 1501 communicates with the memory 1502, and the processor 1501 invokes the execution instruction in the memory 1502 to execute an operation in Embodiment 3 of the foregoing data transmission method.

The site in this embodiment may be configured to execute the technical solution in Embodiment 3 of the foregoing data transmission method of the present invention, and implementation principles and technical effects thereof are similar and are not described herein again.

Figure 16:
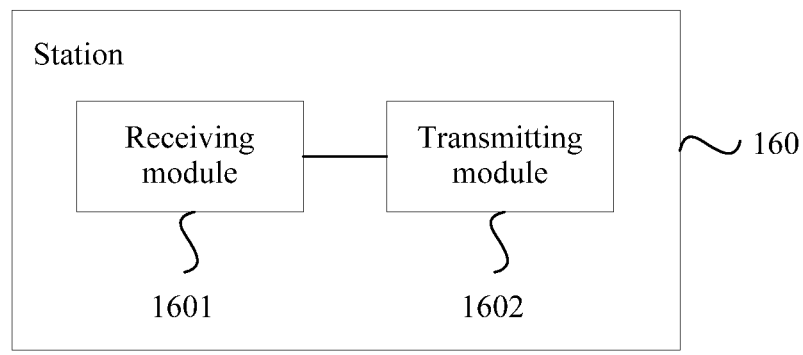
FIG. 16 is a schematic structural diagram of Embodiment 7 of a site according to the present invention.

FIG. 16 is a schematic structural diagram of Embodiment 7 of a site according to the present invention. The site in this embodiment of the present invention may be a second site. As shown in FIG. 16, a site 160 provided in this embodiment includes a receiving module 1601 and a transmitting module 1602.

The receiving module 1601 is configured to receive a first transmit frame and indication information that are transmitted by a first site, where the indication information instructs the second site to delay returning a response frame; and the transmitting module 1602 is configured to transmit the response frame to the first site according to the indication information after at least one preset time length after receiving of the first transmit frame ends.

Optionally, the receiving module 1601 is specifically configured to receive the first transmit frame transmitted by the first site, where the first transmit frame includes the preset time length; and correspondingly, the transmitting module 1602 is specifically configured to transmit the response frame to the first site according to the first transmit frame after at least the preset time length after receiving of the first transmit frame ends; or the receiving module 1601 is further specifically configured to receive the first transmit frame and notification signaling that are transmitted by the first site, where the notification signaling includes the preset time length; and correspondingly, the transmitting module 1602 is further specifically configured to transmit the response frame to the first site according to the notification signaling after at least the preset time length after receiving of the first transmit frame ends; or the receiving module 1601 is further specifically configured to: receive the first transmit frame transmitted by the first site, where the first transmit frame includes information used to instruct the second site temporarily not to return the response frame after the first transmit frame is received;

receive a response request frame, where the response request frame is transmitted by the first site after at least the preset time length after transmission of the first transmit frame ends, and the response request frame is used to instruct the second site to return the response frame; and correspondingly, the transmitting module 1602 is further specifically configured to transmit the response frame to the first site according to the response request frame.

The site in this embodiment may be used for the technical solution in Embodiment 4 of the data transmission method, and implementation principles and technical effects thereof are similar and are not described herein again.

Figure 17:
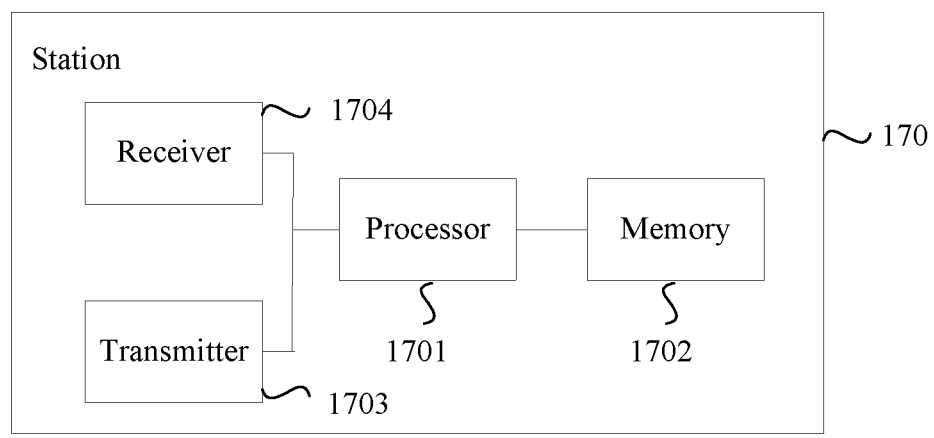
FIG. 17 is a schematic structural diagram of Embodiment 8 of a site according to the present invention.

FIG. 17 is a schematic structural diagram of Embodiment 8 of a site according to the present invention. The site in this embodiment of the present invention may be a second site. As shown in FIG. 17, a site 170 provided in this embodiment includes a processor 1701 and a memory 1702. The site 170 may further include a transmitter 1703 and a receiver 1704. The transmitter 1703 and the receiver 1704 may be connected to the processor 1701. The transmitter 1703 is configured to transmit data or information, the receiver 1704 is configured to receive data or information, and the memory 1702 is configured to store an execution instruction. When the site 170 runs, the processor 1701 communicates with the memory 1702, and the processor 1701 invokes the execution instruction in the memory 1702 to execute an operation in Embodiment 4 of the foregoing data transmission method.

The site in this embodiment may be configured to execute the technical solution in Embodiment 4 of the foregoing data transmission method of the present invention, and implementation principles and technical effects thereof are similar and are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data transmission method, comprising:
   receiving, by a third site, a first transmit frame transmitted by a first site to a second site, and acquiring a transmission end time of the first transmit frame;
   transmitting, by the third site, a second transmit frame to a fourth site, and instructing the fourth site to delay returning a response frame; and
   receiving, by the third site after at least one preset time length after transmission of the second transmit frame ends, the response frame transmitted by the fourth site;
   wherein the third site is within a coverage area of the first site, and the second site is outside a coverage area of the third site; a transmission end time of the second transmit frame is not later than the transmission end time of the first transmit frame, and the preset time length is greater than or equal to a difference between the transmission end time of the first transmit frame and the transmission end time of the second transmit frame.

2. The method according to claim 1, wherein the acquiring, by a third site, a transmission end time of the first transmit frame comprises:
   obtaining, by the third site, the transmission end time of the first transmit frame by parsing frame header information of the first transmit frame.

3. The method according to claim 1, wherein the transmitting, by the third site, a second transmit frame to a fourth site, and instructing the fourth site to delay returning a response frame comprises at least one of:
   transmitting, by the third site, the second transmit frame to the fourth site, wherein the second transmit frame comprises the preset time length, so that the fourth site returns the response frame after at least the preset time length after receiving of the second transmit frame ends;
   transmitting, by the third site, the second transmit frame to the fourth site, and transmitting, to the fourth site, notification signaling comprising the preset time length, so that the fourth site returns the response frame after at least the preset time length after receiving of the second transmit frame ends; and
   transmitting, by the third site, the second transmit frame to the fourth site, wherein the second transmit frame comprises information used to instruct the fourth site temporarily not to return the response frame after the second transmit frame is received;
   transmitting, by the third site, a response request frame to the fourth site after at least the preset time length after the transmission of the second transmit frame ends, wherein the response request frame is used to instruct the fourth site to return the response frame.

4. The method according to claim 1, before the transmitting, by the third site, a second transmit frame to a fourth site, further comprising:
   determining, by the third site, that the first site is a transmission opportunity holding node of the third site.

5. The method according to claim 1, before the receiving, by a third site, a first transmit frame transmitted by a first site to a second site, further comprising:
   establishing, by the third site, a list of neighbor sites.

6. The method according to claim 1, before the acquiring, by a third site, a transmission end time of the first transmit frame, further comprising:
   parsing, by the third site, the frame header information of the first transmit frame, and acquiring identification information of a receiving site that receives the first transmit frame; and
   determining, by the third site, whether the identification information of the receiving site is in the list of neighbor sites of the third site, and if the identification information of the receiving site is not in the list of neighbor sites of the third site, executing the operation of acquiring a transmission end time of the first transmit frame.

7. A data transmission method, comprising:
   receiving, by a fourth site, a second transmit frame and indication information that are transmitted by a third site, wherein the indication information instructs the fourth site to delay returning a response frame, and a transmission end time of the second transmit frame is not later than a transmission end time of a first transmit frame transmitted by a first site to a second site; and
   transmitting, by the fourth site, the response frame to the third site according to the indication information after at least one preset time length after receiving of the second transmit frame ends;
   wherein the third site is within a coverage area of the first site, and the second site is outside a coverage area of the third site; the preset time length is greater than or equal to a difference between the transmission end time of the first transmit frame and the transmission end time of the second transmit frame.

8. The method according to claim 7, wherein:
   the receiving, by a fourth site, a second transmit frame and indication information that are transmitted by a third site, wherein the indication information instructs the fourth site to delay returning a response frame comprises:
   receiving, by the fourth site, the second transmit frame transmitted by the third site, wherein the second transmit frame comprises the preset time length; and
   correspondingly, the transmitting, by the fourth site, the response frame to the third site according to the indication information after at least one preset time length is after the second transmit frame is received comprises:

transmitting, by the fourth site, the response frame to the third site according to the second transmit frame after at least the preset time length after receiving of the second transmit frame ends;

or the receiving, by a fourth site, a second transmit frame and indication information that are transmitted by a third site, wherein the indication information instructs the fourth site to delay returning a response frame comprises:

receiving, by the fourth site, the second transmit frame and notification signaling that are transmitted by the third site, wherein the notification signaling comprises the preset time length; and correspondingly, the transmitting, by the fourth site, the response frame to the third site according to the indication information after at least one preset time length after receiving of the second transmit frame ends comprises:

transmitting, by the fourth site, the response frame to the third site according to the notification signaling after at least the preset time length after receiving of the second transmit frame ends;

or the receiving, by a fourth site, a second transmit frame and indication information that are transmitted by a third site, wherein the indication information instructs the fourth site to delay returning a response frame comprises:

receiving, by the fourth site, the second transmit frame transmitted by the third site, wherein the second transmit frame comprises information used to instruct the fourth site temporarily not to return the response frame after the second transmit frame is received; and receiving, by the fourth site, a response request frame transmitted by the third site after at least the preset time length after transmission of the second transmit frame ends, wherein the response request frame is used to instruct the fourth site to return the response frame; and correspondingly, the transmitting, by the fourth site, the response frame to the third site according to the indication information after at least one preset time length after receiving of the second transmit frame ends comprises:

transmitting, by the fourth site, the response frame to the third site according to the response request frame.

9. A site, wherein the site is a third site and the site comprises:

a receiver configured to: receive a first transmit frame transmitted by a first site to a second site, and acquire a transmission end time of the first transmit frame;

a transmitter configured to: transmit a second transmit frame to a fourth site, and instruct the fourth site to delay returning a response frame; and the receiver is further configured to receive, after at least one preset time length after transmission of the second transmit frame ends, the response frame transmitted by the fourth site;

wherein the third site is within a coverage area of the first site, and the second site is outside a coverage area of the third site; a transmission end time of the second transmit frame is not later than the transmission end time of the first transmit frame, and the preset time length is greater than or equal to a difference between the transmission end time of the first transmit frame and the transmission end time of the second transmit frame.

10. The site according to claim 9, wherein the receiver is specifically configured to obtain the transmission end time of the first transmit frame by parsing frame header information of the first transmit frame.

11. The site according to claim 9, wherein the transmitter is specifically configured to perform at least one of:

transmit the second transmit frame to the fourth site, wherein the second transmit frame comprises the preset time length, so that the fourth site returns the response frame after at least the preset time length after receiving of the second transmit frame ends;

transmit the second transmit frame to the fourth site, and transmit, to the fourth site, notification signaling comprising the preset time length, so that the fourth site returns the response frame after at least the preset time length after receiving of the second transmit frame ends;

and transmit the second transmit frame to the fourth site, wherein the second transmit frame comprises information used to instruct the fourth site temporarily not to return the response frame after the second transmit frame is received; and transmit a response request frame to the fourth site after at least the preset time length after the transmission of the second transmit frame ends, wherein the response request frame is used to instruct the fourth site to return the response frame.

12. The site according to claim 9, further comprising:

a processor configured to determine if the first site is a transmission opportunity holding node of the third site.

13. The site according to claim 9, wherein:

the processor is further configured to establish a list of neighbor sites.

14. The site according to claim 9, wherein the processor is further configured to:

parse the frame header information of the first transmit frame, and acquire identification information of a receiving site that receives the first transmit frame; and determine whether the identification information of the receiving site is in the list of neighbor sites of the third site; and if the identification information of the receiving site is not in the list of neighbor sites of the third site, the receiver is configured to execute the operation of acquiring a transmission end time of the first transmit frame.

15. A site, wherein the site is a fourth site and the site comprises:

a receiver configured to receive a second transmit frame and indication information that are transmitted by a third site, wherein the indication information instructs the fourth site to delay returning a response frame, and a transmission end time of the second transmit frame is not later than a transmission end time of a first transmit frame transmitted by a first site to a second site; and a transmitter configured to transmit the response frame to the third site according to the indication information after at least one preset time length after receiving of the second transmit frame ends;

wherein the third site is within a coverage area of the first site, and the second site is outside a coverage area of the third site; the preset time length is greater than or equal to a difference between the transmission end time of the first transmit frame and the transmission end time of the second transmit frame.

16. The site according to claim 15, wherein:
the receiver is specifically configured to receive the second transmit frame transmitted by the third site, wherein the second transmit frame comprises the preset time length; and
correspondingly, the transmitter is specifically configured to transmit the response frame to the third site according to the second transmit frame after at least the preset time length after receiving of the second transmit frame ends;
or
the receiver is further specifically configured to receive the second transmit frame and notification signaling that are transmitted by the third site, wherein the notification signaling comprises the preset time length; and
correspondingly, the transmitter is further specifically configured to transmit the response frame to the third site according to the notification signaling after at least the preset time length after receiving of the second transmit frame ends;
or
the receiver is further specifically configured to: receive the second transmit frame transmitted by the third site, wherein the second transmit frame comprises information used to instruct the fourth site temporarily not to return the response frame after the second transmit frame is received, and receive a response request frame transmitted by the third site after at least the preset time length after transmission of the second transmit frame ends, wherein the response request frame is used to instruct the fourth site to return the response frame; and
correspondingly, the transmitter is further specifically configured to transmit the response frame to the third site according to the response request frame.

* * * * *